United States Patent [19]

Taylor

[11] Patent Number: 4,901,761

[45] Date of Patent: Feb. 20, 1990

[54] CLOSURE APPARATUS WITH PRESSURE TEST DEVICE

[76] Inventor: William T. Taylor, P.O. Box 309, Warren, Tex. 77664

[21] Appl. No.: 254,147

[22] Filed: Oct. 6, 1988

[51] Int. Cl.⁴ ............................................... F16K 37/00
[52] U.S. Cl. ............................... 137//557; 73/40.5 R; 73/707; 73/756; 175/48
[58] Field of Search ................. 73/40.5, 707, 756; 166/325; 137/557; 175/218, 318, 48

[56] References Cited

U.S. PATENT DOCUMENTS

| | | | |
|---|---|---|---|
| 284,067 | 8/1883 | Ross et al. | 175/48 |
| 2,313,169 | 3/1943 | Penick et al. | 73/40.5 R |
| 2,618,978 | 11/1952 | Ragland | 73/756 |
| 2,832,556 | 4/1958 | Bielstein | 175/48 |
| 3,331,385 | 7/1967 | Taylor | 137/515 |
| 3,566,696 | 3/1971 | Maddison et al. | 73/756 |
| 3,915,008 | 10/1975 | Silverman et al. | 73/707 |
| 4,754,818 | 7/1988 | Wood | 175/48 |

*Primary Examiner*—A. Michael Chambers
*Attorney, Agent, or Firm*—J. Peppers

[57] ABSTRACT

A drilling fluid saver valve apparatus incorporating a pressure test device. The apparatus includes a tubular body having a valve seat and a closure check valve moveably mounted in spring loaded relation within the body to be normally seated in closed relation to permit flow of fluids under pressure only from a drilling kelly into the drillpipe, and a pressure test device connected into a side port formed in the body between the valve seat and drillpipe.

8 Claims, 1 Drawing Sheet

U.S. Patent　　　Feb. 20, 1990　　　4,901,761
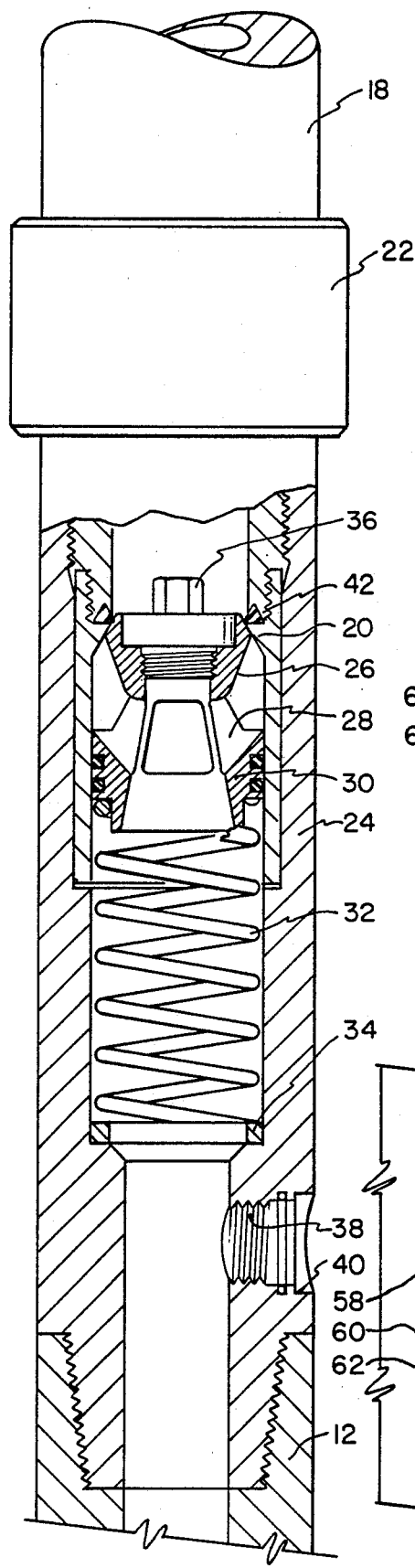
FIG. 2
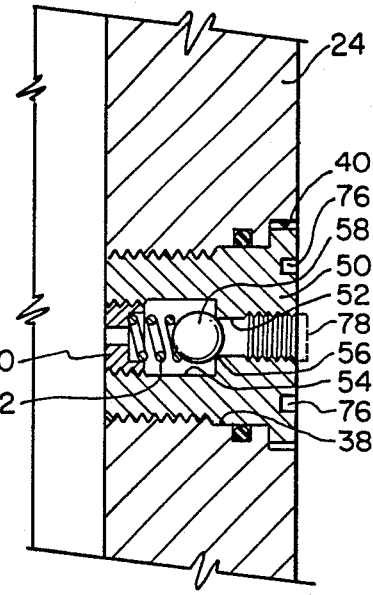
FIG. 3
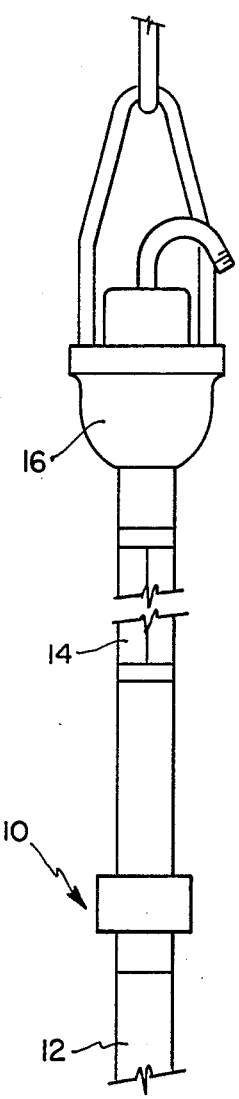
FIG. 1
(PRIOR ART)
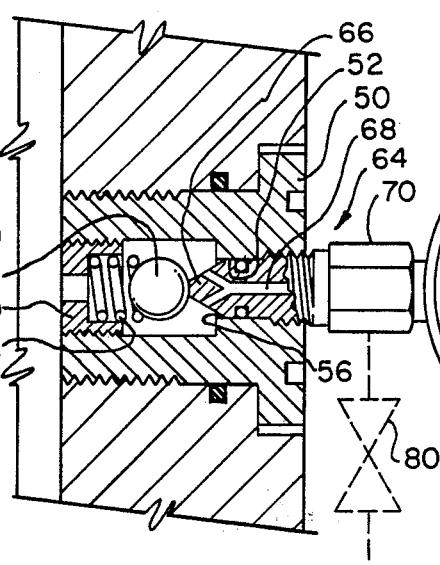
FIG. 4
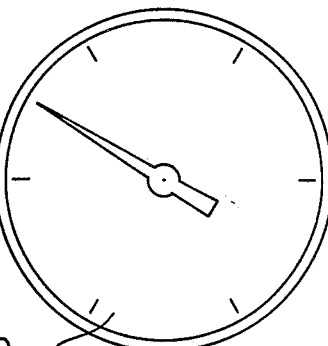

CLOSURE APPARATUS WITH PRESSURE TEST DEVICE

BACKGROUND OF THE INVENTION

The present invention generally relates to an improvement in closure apparatus used in drilling of oil wells and more particularly relates to an improvement to the automatic kelly valve closure apparatus disclosed in Taylor U.S. Pat. No. 3,331,385. Accordingly, the disclosure of U.S. Pat. No. 3,331,385 is specifically incorporated herein by reference.

Commonly used expressions for the present apparatus is a mud saver valve or automatic kelly valve. The automatic kelly valve, such as herein disclosed, is attached at the bottom of a drilling kelly and is a specialized tool with versatile characteristics. The valve is designed essentially to eliminate the loss of costly drilling fluids as is lost from the drilling kelly each time the kelly is connected to the drillpipe as the drillpipe is being added into the well by section during drilling operations. This automatic kelly valve automatically closes and retains the drilling fluid in the drilling kelly each time the kelly is disconnected from the drillpipe. The automatic kelly valve is spring loaded as a check valve and opens only when the pump pressure of the mud pumps becomes greater than the weight of the drilling fluid retained in the kelly. This prevents costly fluid loss and a hazardous muddy rig floor when the drilling crew are making connection or disconnection of the drillpipe.

At times, particularly when the drillpipe is being added into the well bore, an earth formation down within the well bore may have pressure exceeding the weight of the drilling fluid in the drill bore and the well is inclined to "kick" with pressure coming into the well from the well formation. This particular phenomena is aggravated with the sudden loss of fluid pressure as the mud pumps are stopped when a section of drillpipe is being added.

An advantage of the automatic kelly valve is that it has a tool port plug in the check valve body which may be removed when desired and' the oil well tool such as a point indicator or backoff shot device can be lowered through the kelly valve for performance down within or below the drillpipe. In the present invention a pressure gauge may be installed into a special test valve body provided below the automatic valve to test the pressure inside the drillpipe before the drillpipe connection is broken and also to sample the contents within the drillpipe as containing mud only or possibly gas along with the mud.

The presently known prior art consists of the following U.S. Pat. Nos.: Hart 403,751, Neighbors 946,684, Brown 1,462,099, Thomson 1,596,260, Nixon et al 1,674,055, Lemex 1,785,271, Baker et al 2,750,958, Callahan et al. 3,189,046, Brown 3,191,905, and Taylor 3,331,385 as previously mentioned.

The prior art is generally represented in FIG. 1 of the patent drawing. As shown, a closure apparatus or automatic kelly valve is connected between a drillpipe and a drilling kelly. The kelly is connected further into a swivel assembly including a swivel, bail and rotary hose. The assembly is further connected through piping to a mud pump (not shown).

Drilling fluids are pumped through the kelly, the closure apparatus and the drill string into a drill bit located at the bottom of the well bore. It is noted that hydraulic pressure is applied through the kelly and the drilling mud acts on the closure member to move the valve out of its valve seat. Pressure in the drill pipe operates to close the closure member off until such time as pressure within the kelly is sufficient to overcome the check valve spring in the closure.

When the drillpipe string is disconnected from the closure apparatus for any purpose, the mud pumping apparatus is shut off. The resilient spring of the valve in the closure comes into contact to seal the passage means through the kelly and the closing of the apparatus maintains a standing column of drilling fluid in the kelly above the closure apparatus. The retention of the drilling fluid in the kelly reduces waste of expensive drilling fluids and, even more especially, reduces the dangers inherent with a slippery and wet drilling platform to the drilling crew.

As will occasionally happen without forewarning, the drill may penetrate a reservoir under high pressure and gas and oil or a mixture of both, will tend to overcome the present pressure of column of drilling fluids standing in the drillpipe string. On such an occurrence, the reservoir pressure tends to force the drilling fluids back through the closure apparatus and through the kelly into the mud pumping apparatus. The closure apparatus operates to hold the drilling muds under any blowout pressure in the drillpipe string. The higher pressure acting on the closure valve urges the valve more firmly into contact with its seat.

OBJECTS OF THE INVENTION

A principal object of the present invention is to provide test pressure means to determine the magnitude of any pressure contained in the drillpipe.

Another object of the present invention is to provide means to sample the fluids in the drillpipe and determine not only the pressure of such fluids but also the constituency of such fluids as being gas or oil.

Another object of the present invention is to vent the pressure in the drillpipe, on a sample basis, to determine if the pressure will drop off a short blow down period.

SUMMARY OF THE INVENTION

The foregoing and other objects and advantages of the invention are attained by a closure valve apparatus having a pressure test device and adapted for threaded connection between a drilling kelly and a drillpipe. The apparatus includes a tubular upper body having a valve seat, a tubular lower body threadedly connected to the upper body, a closure check valve moveably mounted in spring loaded relation within the lower body to be normally seated in closed relation against the valve seat and to permit flow of fluids under pressure only from the kelly into the drillpipe. A pressure test device is connected into a side port formed in the lower body between the valve seat and the drillpipe. The pressure test device includes a generally cylindrical test valve body threaded in sealed relation into the side port of the lower body with the test valve body having an exterior stop flange disposed in an exterior counter bore formed in the side port. A test bore and a test counter bore is axially formed through the test valve body. A spring retainer sleeve is threaded into connection into the test counter bore. A check test valve is urged by a spring into closed position against a test valve seat formed between the test bore and the test counter bore. The spring is disposed in compression between the test check valve and the retainer sleeve. A test probe body having a probe nose is adapted to push the test valve away from the test valve seat as the probe body is threaded into connection within the test bore. The test probe member has a fluid pressure passageway extending from the probe nose to a pressure gauge connected to the probe member outside the lower body. The test probe member is adapted to transmit fluid pressure from the lower body past he test valve to the pressure gauge. The test probe member is adapted to transmit fluid pressure from the lower body to the pressure gauge when threaded into the test bore a distance sufficient to push the valve member away from the test valve seat. The test check valve may be a ball type valve. The test bore may be closed by a threaded plug until the test probe body is threaded into the test bore. A manual sample flow valve may be connected into the test probe body and the fluid pressure passageway to sample whatever may be within the drillpipe and also to permit blowdown of pressure within the drillpipe if desired. The closure check valve and the closure member may be axially formed with a tool port normally closed off by a tool port plug. This closure is adapted to pass a down hole tool into the drillpipe after removal of the test port plug.

BRIEF DESCRIPTION OF THE DRAWING

FIG. 1 (which is also labeled PRIOR ART) is an elevational view of the top portion of a drilling string including a closure valve incorporating the present invention as shown in FIG. 2;

FIG. 2 is a schematic, partly sectional, elevational view of a modified closure valve as shown at 10 in FIG. 1.;

FIG. 3 is a cross-sectional view of the test port of a closure value in which is mounted a test valve;

FIG. 4 is the cross-sectional view as shown in FIG. 3 and further showing a test probe assembly as mounted for use.

DESCRIPTION OF A PREFERRED EMBODIMENT

FIG. 1 illustrates the prior art to the extent shown and includes a closure apparatus valve 10 connected into drillpipe 12 a drilling kelly 14 and an assembly 16 including a swivel, bail and rotary hose as normally used in a drilling operation.

The closure member 10 is shown further in FIG. 2 to include a tubular upper body 18 threadly connected to a tubular lower body 24. The upper body 18 is shown to include a tubular valve seat 20 which receives a closure valve body 26. An optional rubber wear sleeve 22 may be connected to the upper body 18 as a means of protection.

The closure body 26 includes a ventilated body neck 28 and a cylindrical valve body guide 30. The closure valve body 26 is biased into closure within the seat 20 by means of a support spring 32 mounted in compression against a support spring ring 34. The valve body 26 includes a valve body port closure member 36 which is removable in the event that it becomes desirable to pass tools through the member 10 for use below in the drillpipe 12. The valve seat 20 is shown to include a rubber seal member 42. More detailed description of the structure of the closure member 10 as above described is found in the U.S. Pat. No. 3,331,385, incorporated herewith.

As known, a large volume of abrasive drilling fluids are pumped through closure valve 10 during drilling operations. Consequently all the parts exposed to the drilling fluids are provided of erosion resistant materials and alloys.

The tubular lower body 24 is formed as shown with a threaded side port 38 extending from the inside to the outside of body 24 and formed with an outside counter bore 40.

The side bore 38 and the counter bore 40 of lower member 24 is further shown in FIG. 3 to house a test valve body 50. The test valve body 50 is seen to form a test bore 52 and a test counter bore 54 with a valve seat 56 being formed at the juncture of the bore and counter bore. A test valve element 58 is shown in closed seated position in the valve seat 56 and urged into closed position by a valve spring 62 retained in compression by means of a valve seat spring retainer sleeve 60. The valve element 58 is shown as a ball valve but other types of valves, such as a conical valve, could also be used.

The test valve 50 is shown to have an exterior flange which is mounted in the counter bore 40 of the housing 24. A plurality of recesses 76 are formed in the exterior of the valve body 50 to accommodate a spanner wrench used to install and remove the valve body 50.

FIG. 4 illustrates the test valve body assembly 50 as described with reference to FIG. 3 and additionally shows a test probe device 64 which is threaded into the test bore 52. The test probe 64 includes a probe nose 66 which(extends into the test bore 52 to displace the valve element 58 away from its seat 56 and permit passage of fluid pressure from inside the lower body 24 through passageway 68 formed in the test probe 64 into a pressure gauge 72. The passageway 68 is shown to be divided near the probe nose 66. This divided passageway feature is optional so long as the passageway 68 has free access to the counter bore 54 when the probe nose 66 has pushed the valve element 58 off the seat 56. The test probe 64 includes a section 70 which has wrench flats to facilitate the threaded connection of the test probe 64 into and out of the test bore 52.

The pressure gauge 72 is provided in pressure range to indicate the highest pressure expected to be encountered. For example, if pressures up to 2,000 psi are expected the gauge range provided would be up to about 3,000 psi. Also, to protect the gauge against high pressure pump pulsations, the gauge will be internally equipped with a conventional pulsation damper or snubber (not shown).

As an optional feature, the test probe 64 may include a sample valve 80, shown in dashed lines, which is connected into the probe 64 and into the flow passages 68 so that valve 80 can be opened to permit fluid under pressure from the lower body 24 to escape in the atmosphere. This sample valve 80 would indicate whether the fluids in the drillpipe 12 is drilling fluid, oil, gas, or mixtures entrained in the drilling fluid. Also if pressure has accumulated in the upper end of the drillpipe 12, such pressure may be blown down through the valve 80 as might be desirable.

In normal operation the test valve 50 and related assembly is placed into port 38 of the body 24 and carried with the body 24 during the usual drilling operations. In such instance the bore 52 may carry the test probe 64 or may be plugged by a removable closure plug 78 in order to keep the bore 52 clean.

The test probe 64 and pressure gauge assembly may be inserted into the bore 52 at the outset and carried along with the closure valve 10 during normal drilling operations.

In the event the operating environment might cause damage to the test probe 64 and gauge 72 during the regular drilling operation, the valve body 50 may include only the temporary closure plug 78 until such time that it is needed to ascertain the fluid pressure in the drill pipe 12. At this time the test probe 64 may replace the closure plug 78 and be threaded into the bore 52 a distance sufficient to move the valve element 58 out of the valve seat 56 and thereby give communication of the fluids pressure within the body 24 and drillpipe 12 out to the pressure gauge 72. As seen, an O-ring on the probe nose 66 provides a seal until the threaded connection is completed.

If excessive pressure is found in the drillpipe 12, it might be hazardous to disconnect the closure valve 10 from the drillpipe 12. In the event the sample valve 80 is used with the test probe 64, the valve 80 might be opened for a short time to see if the pressure in drillpipe 12 will blow down to a safe level in a short time. Otherwise, it may be desirable to pump additional drilling fluid into the drill pipe 12 to increase the hydrostatic mud weight in the drillpipe 12 and thereby prevent any blowout of fluids from the drillpipe 12.

In any event, the pressure gauge 72, when installed as shown and described will give an indication of the pressure in drillpipe 12 and the possibility of hazardous conditions and remedial steps to be taken.

It is seen that the closure valve 10 may be used with much more confidence when the operator knows of the pressure within the drillpipe 12 before the closure valve 10 is disconnected.

It will be obvious to those skilled in the art that other changes and modifications may be made to the embodiment herein disclosed in detail without departing from the spirit of the invention or the scope of the appendant claims.

That being claimed is:

1. A closure valve apparatus having a pressure test device and adapted for threaded connection between a drilling kelly and a drillpipe, the apparatus including a tubular upper body having a valve seat, a tubular lower body threadedly connected to said upper body, a closure check valve movably mounted in spring loaded relation within said lower body to be normally seated in closed relation against said valve seat and to permit flow of fluids under pressure only from said kelly into said drillpipe, and a pressure test device connected into a side port formed in said lower body between said valve seat and drill pipe connected to said lower body, said pressure test device comprising:
   (a) a generally cylindrical test body threaded into sealed relation into said side port with said test valve body having an exterior stop flange disposed in an exterior counter bore formed in said side port;
   (b) a test bore and a test counter bore axially formed through said test valve body;
   (c) a spring retainer sleeve in threaded connection in said test counter bore;
   (d) a check test valve urged by a spring into closed position against a test valve seat formed between said test bore and said test counter bore, said spring being disposed in compression between said test check valve and said retainer sleeve;
   (e) a test probe body having a probe nose adapted to push said test valve away from said test valve seat as said test probe body is threaded into connection within said test bore;
   (f) said test probe member having a fluid pressure passageway extending from said probe nose to a pressure gauge connected to said test probe member; and
   (g) said test probe member being adapted to transmit fluid pressure from said lower body past said test valve to said pressure gauge when said probe nose has been extended to push said test valve away from said test valve seat.

2. The apparatus of claim 1 wherein said test check valve is a ball type valve.

3. The apparatus of claim 2 where a manually operated sample valve is connected into said test probe body and into said fluid pressure passageway.

4. The apparatus of claim 3 wherein said closure check valve is formed with an axial tool port normally closed off by a tool port plug, said closure being adapted to pass a down hole tool into aid drillpipe after removal of said test tool port plug.

5. The apparatus of claim 1 wherein a manually operated sample valve is connected into said test probe body and into said fluid pressure passageway.

6. The apparatus of claim 1 wherein said closure check valve is formed with an axial tool port normally closed off by a tool port plug, said closure being adapted to pass a down hole tool into said drillpipe after removal of said test tool port plug.

7. The apparatus of claim 1 wherein said test bore may be kept free of dirt by use of a threaded plug until said test probe body is threaded into said test bore.

8. The apparatus of claim 1 wherein said pressure gauge is equipped with a pulsation dampener.

* * * * *